(12) United States Patent
Kosaki

(10) Patent No.: US 6,687,804 B1
(45) Date of Patent: Feb. 3, 2004

(54) METHOD FOR CONTROLLING MEMORY DEVICE IN DATA MANAGEMENT SYSTEM

(75) Inventor: Makoto Kosaki, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 167 days.

(21) Appl. No.: 09/664,543

(22) Filed: Sep. 18, 2000

(30) Foreign Application Priority Data

Feb. 24, 2000 (JP) ........................................ 2000-047681

(51) Int. Cl.[7] .............................................. G06F 12/00
(52) U.S. Cl. ...................................... 711/172; 711/115
(58) Field of Search ................................ 711/114, 115, 711/170, 171, 172, 173

(56) References Cited

U.S. PATENT DOCUMENTS

| | | | | |
|---|---|---|---|---|
| 5,574,851 A | * | 11/1996 | Rathunde | 711/114 |
| 5,784,703 A | * | 7/1998 | Muraoka et al. | 711/173 |
| 5,822,782 A | * | 10/1998 | Humlicek et al. | 711/114 |
| 5,991,804 A | * | 11/1999 | Bolosky et al. | 709/221 |
| 6,058,489 A | * | 5/2000 | Schultz et al. | 714/7 |
| 6,092,169 A | * | 7/2000 | Murthy et al. | 711/170 |
| 6,154,854 A | * | 11/2000 | Stallmo | 714/6 |
| 6,266,740 B1 | * | 7/2001 | Don et al. | 711/114 |
| 6,347,359 B1 | * | 2/2002 | Smith et al. | 711/111 |
| 6,363,457 B1 | * | 3/2002 | Sundberg | 711/114 |

FOREIGN PATENT DOCUMENTS

JP        7-182225        7/1995

* cited by examiner

Primary Examiner—Hiep T. Nguyen
(74) Attorney, Agent, or Firm—Arent Fox Kintner Plotkin & Kahn PLLC

(57) ABSTRACT

A data management system includes a computer and memory devices. The memory devices can be configured such that their memory areas form a continuous memory area. Each memory device includes a memory area for storing memory configuration information, including information on whether the memory area of the memory device is to be used to form the continuous memory area. Memory devices may be connected to and disconnected from the system without stopping operation of the system. When a memory device is disconnected from the system or a new memory device is connected to the system, the system reforms the continuous memory area based on the memory configuration information stored in each memory device. The system further determines whether data previously stored in the memory devices can be used by the system.

18 Claims, 10 Drawing Sheets

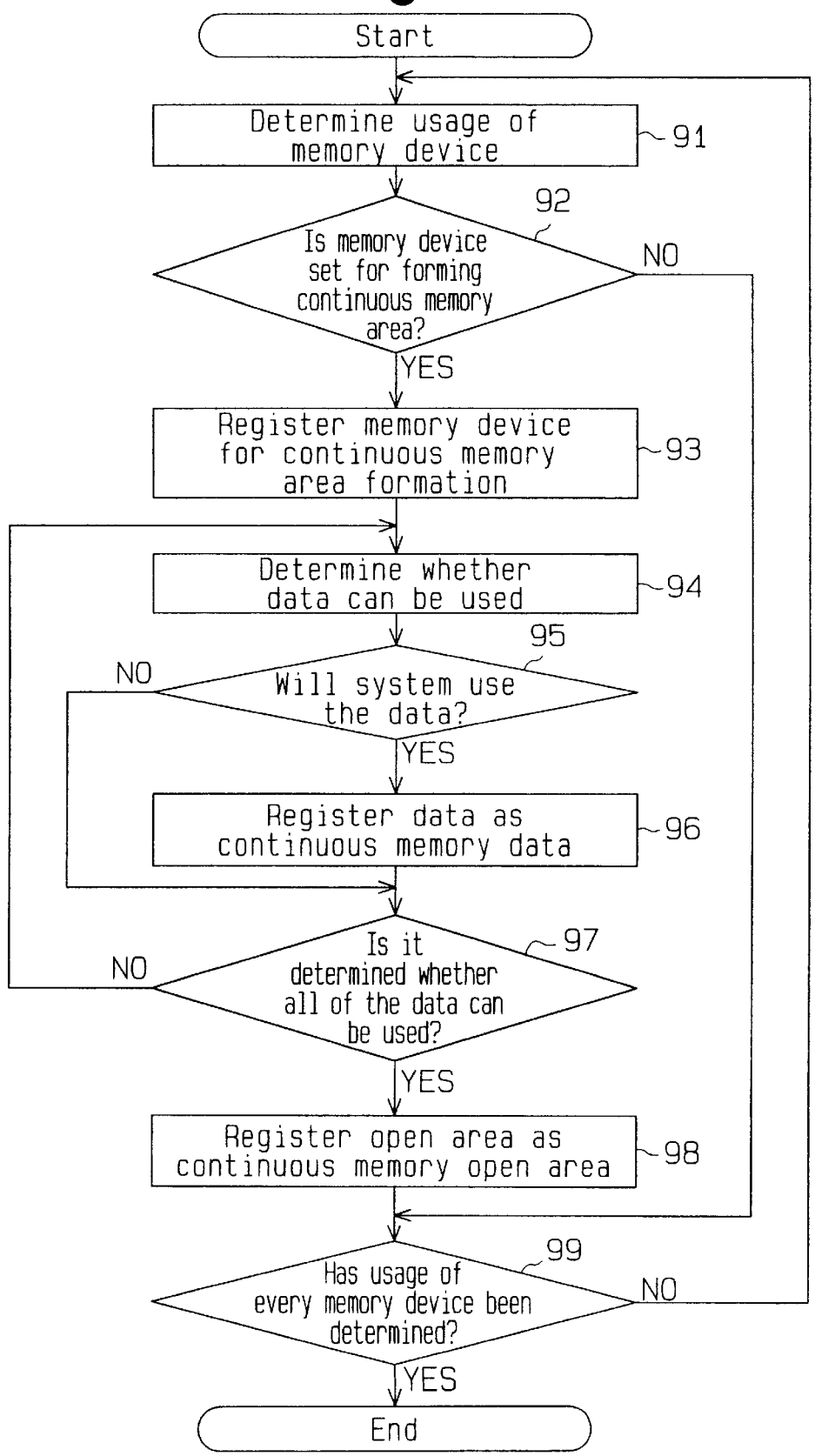

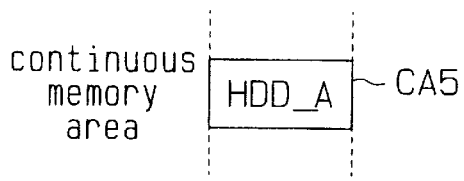
Fig.13(a)
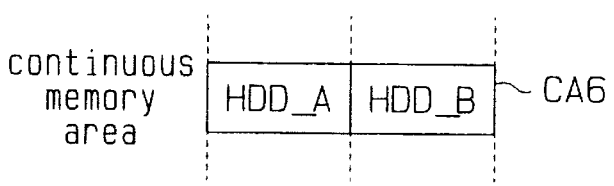
Fig.13(b)
Fig.14
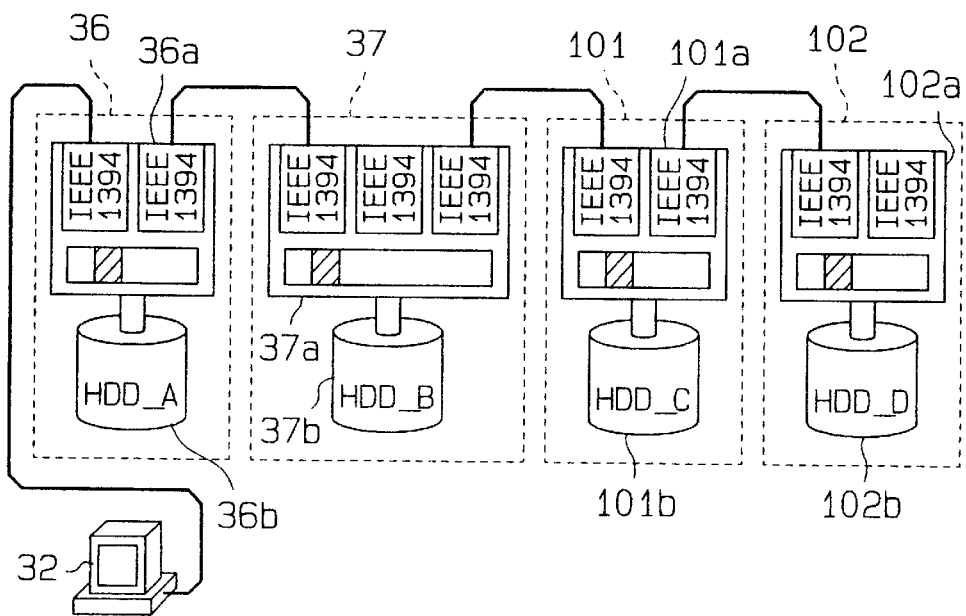

US 6,687,804 B1

METHOD FOR CONTROLLING MEMORY DEVICE IN DATA MANAGEMENT SYSTEM

BACKGROUND OF THE INVENTION

The present invention relates to a data management system, and more particularly, to a data management system that continuously enlarges and reduces a memory area without stopping the system. Further, the present invention relates to a memory device used in a data management system and a program storage medium that form a continuous memory area from a plurality of interconnected memory devices.

In a computer system, an extremely large and continuous memory area is often needed to store a large volume of data, such as for dynamic images. However, the connection of a single memory device to a computer may not be sufficient for obtaining the required large and continuous memory area. Redundant Array of Inexpensive Disks (RAID), in which a plurality of memory devices are connected to a computer to form a single memory area, has thus been proposed. With reference to FIG. 1, in a RAID system, a plurality (e.g., four) of memory devices (volumes) 11, 12, 13, 14 are arranged and configured as a single memory device (volume) 15 in order to disperse and store data in the plurality of volumes 11–14 and increase the processing speed.

In a disk system employing RAID, when the memory capacity is insufficient, a memory device is added during operation of the system. Then, the data stored in the original memory device is transferred to the added memory device and reorganized. In case there is surplus memory area, the data stored in the memory devices 11–14 are transferred to a further RAID disk system and reorganized. One of the memory devices 11–14 (e.g., memory device 12) is then disconnected from the others.

In this manner, although a RAID disk system enables the memory capacity to be enlarged and reduced without stopping operation of the system, data must be reorganized. Accordingly, it takes time for the RAID disk system to perform such memory management functions. Further, during such transfer and reorganization of data, data read and write operations are prohibited. This complicates control of the system.

In addition, if the memory devices have different capacities, the capacity of each memory device cannot be used efficiently. For example, referring to FIG. 2, when employing four memory devices 16, 17, 18, 19 having different memory capacities, the full area of the memory device 16, which has the smallest capacity, and the area in each of the memory devices 17–19 equal to the capacity of the memory device 16 form a first volume 20. The remaining area of the memory devices 18, 19 and the remaining area of the memory device 17 equal to the remaining areas of the memory devices 18, 19 form a second volume 21. The final remaining area of the memory device 17 forms a third volume 22.

The four memory devices 16–19 are then managed as the three volumes 20–22. In this case, the memory capacity of the first volume 20 is smaller than the total memory capacity of the four memory devices 16–19. In other words, a volume that includes the entire capacity of all of the memory devices 16–19 is not formed. This decreases the operational efficiency of the memory devices.

SUMMARY OF THE INVENTION

It is an object of the present invention to provide a method for controlling a memory device that facilitates enlargement and reduction of a memory area and efficiently uses plural memory devices.

To achieve the above object, the present invention provides a method for controlling a plurality of memory devices connected to a system. Each of the memory devices has a memory area. The method includes determining for each of the memory devices whether it is designated for forming a continuous memory area, and forming a single continuous memory area from the memory areas of the designated memory devices.

A further aspect of the present invention provides a data management system including a plurality of memory devices, each having a memory area. A controller determines whether each of the memory devices is usable for forming a continuous memory area and forms a single continuous memory area from the memory areas of the usable memory devices.

Another aspect of the present invention provides a computer-readable storage medium storing a program for controlling a plurality of memory devices in a data management system. Each memory device has a memory area. The program includes determining whether each of the memory devices is usable to form a continuous memory area using the memory area of the memory device, and forming a single continuous memory area from the memory areas of the usable memory devices.

A further aspect of the present invention provides a memory device having a memory area connectable to a system that forms a single continuous memory area using memory areas of a plurality of memory devices. The memory device includes a memory unit for storing management information indicating whether the memory device is usable for forming part of the continuous memory area.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 8 is a flowchart showing a process for forming a continuous memory area;

FIGS. 13(a) and 13(b) are diagrams each showing a continuous memory area formed by the memory device of FIG. 12;

FIG. 14 is a further schematic block diagram showing a memory device according to the present invention;

DETAILED DESCRIPTION OF THE PREFERRED EMBODIMENTS

Figure 1:
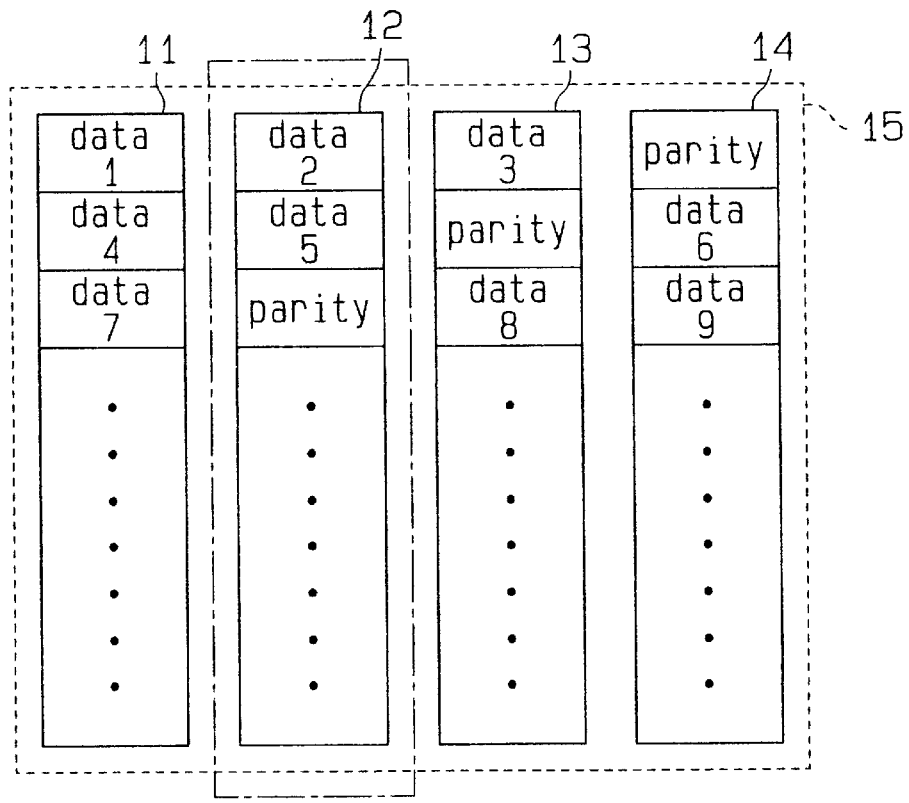
FIG. 1 is a schematic block diagram showing a prior art RAID memory system.
Figure 2:
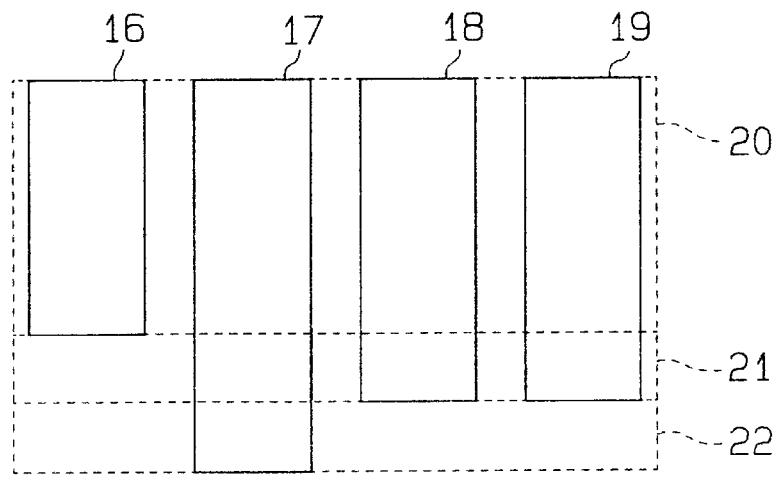
FIG. 2 is a diagram showing the memory capacity of the RAID memory system of FIG. 1.
Figure 3:
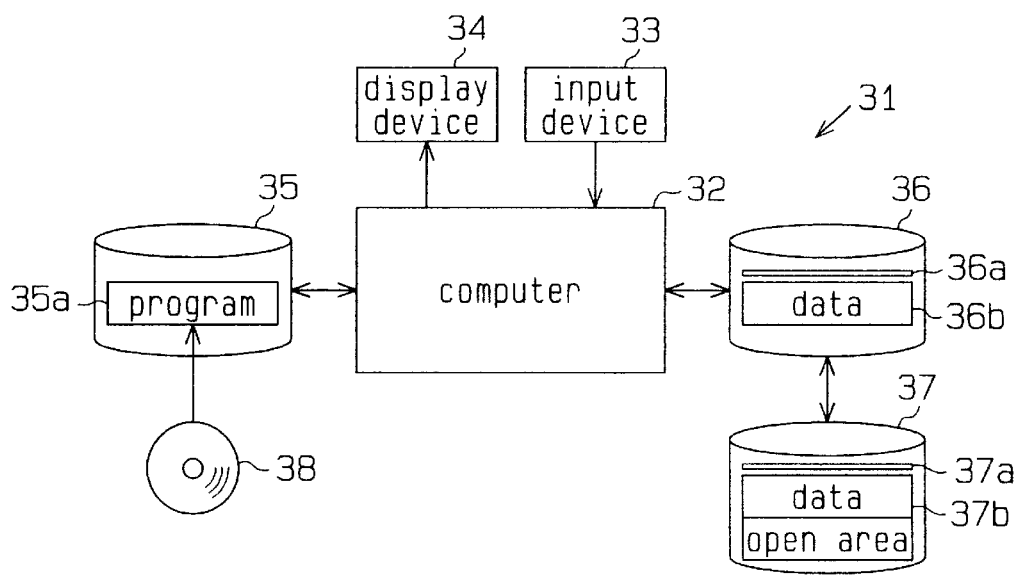
FIG. 3 is a schematic block diagram showing a computer system according to a first embodiment of the present invention.

FIG. 3 is a schematic block diagram showing a data management system 31 according to a first embodiment of the present invention. The system 31 includes a computer 32, an input device 33, a display device 34, and first to third memory devices 35, 36, 37.

The input device 33 includes a keyboard and a mouse (neither shown), which are used to input requests, commands, and parameters. The display device 34 includes a VDT, a monitor, and a printer to display various information.

The memory devices 35–37 may each be a magnetic disk device, an optical disk device, a magneto-optical disk device, or a card memory device that is selected in accordance with the type and form of the data stored in the memory device 35–37. The memory device 35 stores program data, or an operating system (OS) 35a, and the memory devices 36, 37 store data. The OS 35a may be formed by a plurality of programs, each associated with different functions. Further, the OS 35a includes a control program for controlling the formation of a single continuous memory area from the memory areas of the memory devices 36, 37. When the configuration of the memory devices is changed, the control program includes program data for re-forming a continuous memory area subsequent to the configuration change in accordance with memory device management information stored in each memory device.

The second and third memory devices 36, 37 are each capable of forming a continuous memory area and have a hot plugging function. Further, the second and third memory devices 36, 37 include interfaces 36a, 37a, which store memory device management information, and memory units 36b, 37b, respectively. The memory device management information includes information indicating whether the associated memory device can form a continuous memory area. The computer 32 executes the control program of the OS 35a and controls the second and third memory devices 36, 37 to form a single continuous memory area with the memory units 36b, 37b. The capacity of the single continuous memory area is equal to the total capacity of the second and third memory devices 36, 37. Accordingly, the memory area of each of the memory devices 36, 37 is used efficiently.

When a further memory device having the hot plugging function is connected to the system 31 during operation, the computer 32 determines from the memory device management information of the added memory device whether or not the newly added memory device has been connected to form a continuous memory area. If the computer 32 determines that the newly added memory device has been connected to form a continuous memory area, the computer 32 forms a single continuous memory area using the memory areas of the newly added memory device and the second and third memory areas 36, 37.

When one of the three memory devices is disconnected from the system 31, the computer 32 uses the memory areas of the remaining second and third memory devices 36, 37 to form a single continuous memory area. In this case, data having a size larger than the memory capacity of the second memory device 36 (or data having a size larger than the open memory area of the second memory device 36) is stored in the second and third memory devices 36, 37.

It is preferred that the OS 35a be provided from a storage medium 38. The storage medium may be a computer-readable portable storage medium, such as a memory card, a floppy disk, and an optical disk (CD-ROM, DVD-ROM), a magneto optical disk (MO, MD), or a main memory device or auxiliary memory device of another computer connected to the system 31 through a network. The OS 35a may be copied or installed in the memory device 35 from the storage medium 38 and loaded to a main memory device (not shown) later. Alternatively, the OS 35a may be directly loaded to the main memory device from the storage medium.

Figure 4:
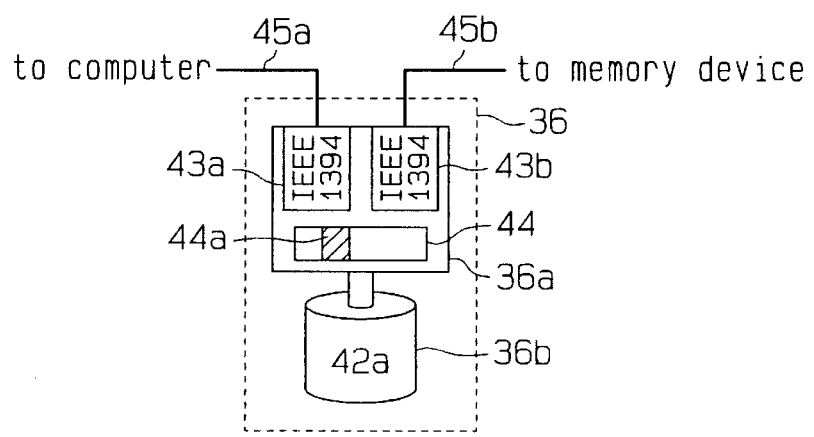
FIG. 4 is a schematic block diagram showing a memory device of the computer system of FIG. 3.

FIG. 4 is a schematic block diagram of the second memory device 36.

The memory device 36 includes an interface 36a, through which data is transferred in accordance with the IEEE 1394 standard to the interfaces of other devices, and a memory unit 36b, which has a predetermined memory area 42a. The interface 36a has a plurality of (e.g. two) ports 43a, 43b and a configuration ROM 44 for storing inherent identification information. The ports 43a, 43b are connected to the computer 32 and the memory device 37 by IEEE 1394 bus cables 45a, 45b, respectively. The configuration ROM 44 stores memory device management information 44a.

The computer 32 reads the memory device management information 44a from the configuration ROM 44 of the memory device 36 and determines from the management information 44a whether or not the memory device 36 is being used to form a continuous memory area.

Figure 5:
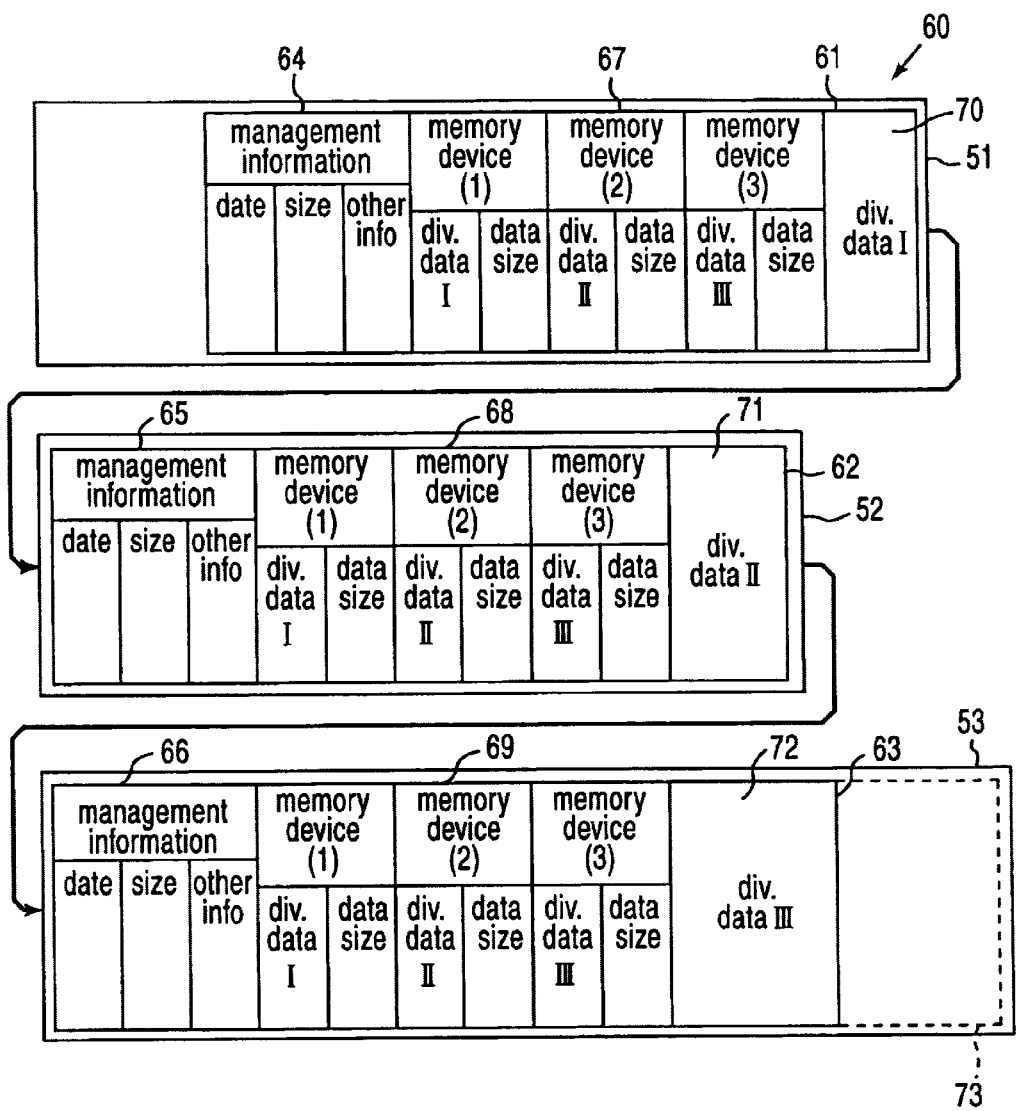
FIG. 5 is a diagram showing data management information stored in a memory device according to the present invention.

FIG. 5 is a diagram illustrating the data management information. An example in which a single continuous memory area is formed using three memory devices 51, 52, 53 will now be discussed.

The memory devices 51–53 store data 60. More specifically, the data 60 includes a first divisional data 61 stored in the first memory device 51, a second divisional data 62 stored in the second memory device 52, and a third divisional data 63 stored in the third memory device 53. The divisional data 61–63 include general management data 64–66, divisional information 67–69, which serve as data management information, and data 70–72, respectively.

The general management information 64 of the first divisional data 61 includes the data recording date, the size of the data, and other information, such as the owner of the data (identification information identifying the system that recorded the data). The general management information 65, 66 of the second and third divisional data 62, 63 include information identical to that of the general management information 64.

The divisional information 67–69 indicate the storage state of the data 60. The first divisional information 67 includes information indicating the location and size of the data stored in each of the memory devices 51–53. The second and third divisional information 68, 69 include information identical to that of the first divisional information 67. The first to third divisional information 67–69 each includes a pointer to the divisional data (I) stored in the first memory device 51, the size of the divisional data (I), a pointer to the divisional data (II) stored in the second memory device 52, the size of the divisional data (II), a pointer to the divisional data (III) stored in the third memory device 53, and the size of the divisional data (III). The divisional information 67–69 enable the computer 32 to determine how many parts the data is divided into and in which memory device the divided data is stored.

When a memory device in which data is stored is connected to another system, the computer of that system determines whether the stored data can be used in that system. For example, to use the open area 73 of the third memory device 53 in another system, the third memory device 53 is connected to that system. In this state, the computer of that system recognizes the connected memory device 53 and determines whether the data 72 can be used from the management information 66 and the divisional information 69 of the memory device 53. In this manner, the data 72 can be used in multiple systems.

When the memory device 53 is reconnected to the original system, the original system determines whether or not the data stored by the other system can be used from the data management information. This enables the memory device 53 to be used in multiple systems.

Figure 6:
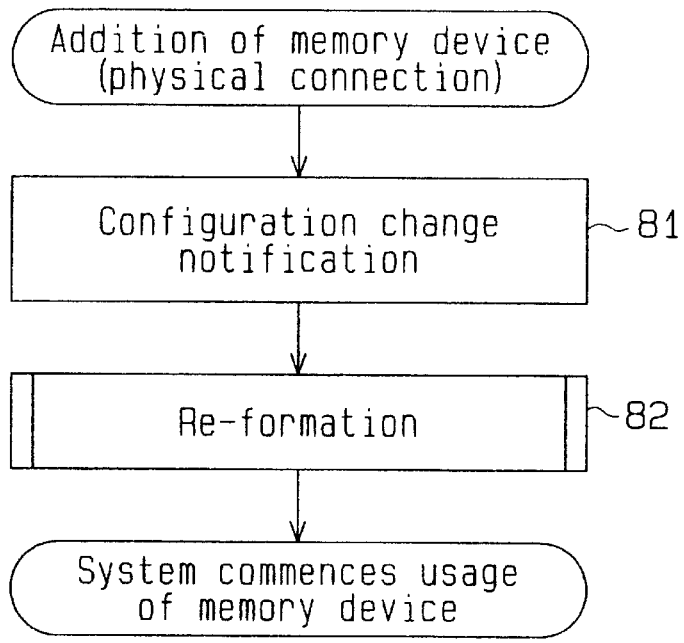
FIG. 6 is a flowchart showing a process for enlarging a continuous memory area in accordance with the present invention.

FIG. 6 is a flowchart illustrating a process for adding a memory device to enlarge a continuous memory area. The process includes configuration change notification performed in step 81 and continuous memory area reformation performed in step 82. At step 81, the interface of the newly added memory device or the interface of the system to which the newly added memory device is connected notifies the computer 32 of a configuration change. In step 81, the notification of the configuration change may be performed by the user via the input device 33. Alternatively, the computer 32 may monitor the configuration of the connected devices and automatically detect the configuration change.

At step 82, the computer 32 reforms the continuous memory area and defines the continuous memory area that can be used by the user. More specifically, the computer 32 first determines whether each of the memory devices connected to the system is used to form a continuous memory area or an independent memory area. The computer 32 then determines whether the data stored in the memory devices forming the continuous memory area may be used by the system. If the data is usable, the data is stored as continuous memory area data.

When a memory device is added and reformation of the continuous memory area by the computer 3 is completed, the computer 32 begins to use the memory device again. If a memory device for forming an independent memory area is added, the memory device is recognized as a new volume, and the number of computer-usable volumes increases.

Figure 7:
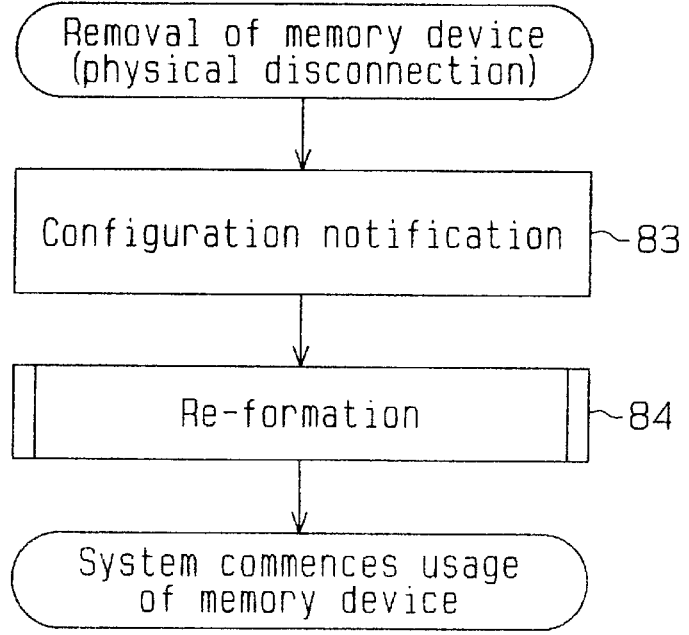
FIG. 7 is a flowchart showing a process for reducing a continuous memory area.

FIG. 7 is a flowchart illustrating a process for decreasing the number of memory devices and reducing the continuous memory area. The process includes configuration change notification performed in step 83 and continuous memory area reformation performed in step 84. When a memory device that forms part of a continuous memory area is disconnected from the system, substantially the same processing as steps 81 and 82 are performed in steps 83 and 84.

FIG. 8 is a flowchart illustrating the continuous memory area reformation performed in steps 82 and 84. At step 91, the computer 32 reads the memory device management information from the memory device to determine how the memory device is used. Then, at step 92, based on the read memory device management information, the computer 32 determines whether the memory device has been set to form a continuous memory area. If the memory device has been set to form a continuous memory area, the computer 32 proceeds to step 93, and if not, the computer 32 proceeds to step 99.

At step 93, the computer 32 registers the memory device as a device for forming a continuous memory area in the memory device management information of the system and then proceeds to step 94.

At step 94, the computer 32 reads the data management information from the memory device, stored in the memory device management information, to determine whether the data can be used. At step 95, based on the data management information, the computer 32 determines whether the data will be used by its system. If the data is going to be used, the computer 32 proceeds to step 96, and if not, the computer 32 proceeds to step 97.

At step 96, the computer 32 registers the data used by the system as continuous memory data and proceeds to step 97.

At step 97, the computer 32 determines whether it has been determined if all of the data of the memory device can be used or not. If a determination has not been generated for all of the data of the memory device, the computer 32 returns to step 94. If a determination has been generated for all of the data of the memory device, the computer 32 proceeds to step 98. Thus, steps 94–97 determine whether all of the data stored in the memory device may be used.

At step 98, the computer 32 registers the open memory area of the memory device as an open memory area of the system and proceeds to step 99.

At step 99, the computer 32 determines whether the usage of every memory device has been determined. If the usage of every memory device has not been determined, the computer 32 returns to step 91, otherwise, the computer 32 completes reformation of the continuous memory area. In this manner, the computer 32 performs steps 91 to 99 to determine the usage of every memory device.

The operation of the computer system 31 will now be described with reference to FIGS. 9 to 17. The memory device 35 for storing the OS 35a is not shown in these drawings.

[Expansion of Continuous Memory Area when Memory Device is Added]

Figure 9A:
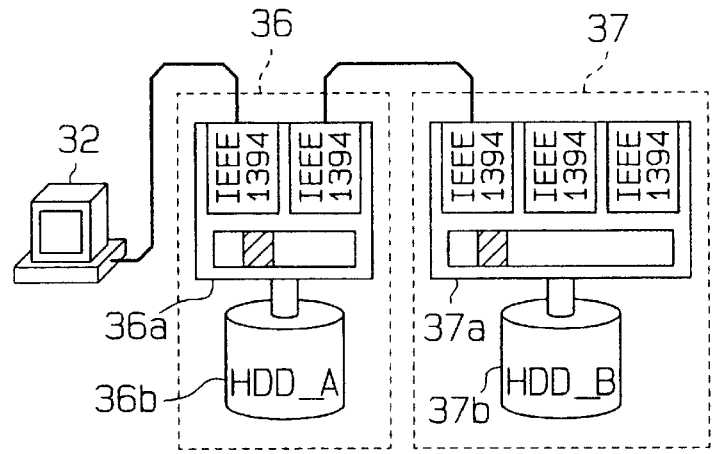
FIG. 9(a) is a schematic block diagram showing memory devices according to the present invention.
Figure 9B:
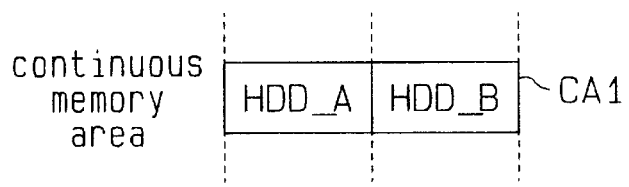
FIG. 9(b) is a continuous memory area formed by the memory devices of FIG. 9(a)

As shown in FIG. 9(a), the two memory devices 36, 37 are connected to the computer 32. The memory devices include the interfaces 36a, 37a, which comply with the IEEE 1394 standard, and the memory units 36b, 37b having memory areas HDD_A, HDD_B, respectively. The memory devices 36, 37 are set to form a continuous memory area. Referring to FIG. 9(b), the computer 32 forms a continuous memory area CA1 with the memory areas HDD_A, HDD_B.

Figure 10:
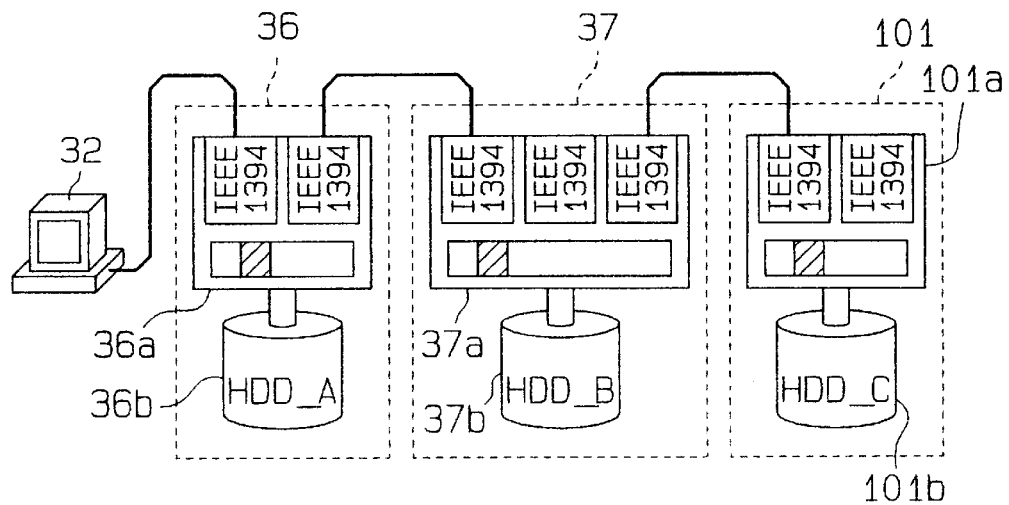
FIG. 10 is a schematic block diagram showing memory devices according to the present invention.
Figure 11:
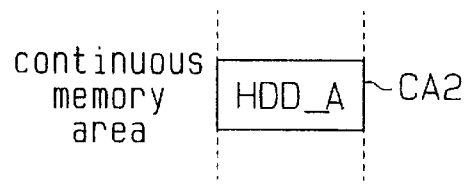
FIGS. 11(a), 11(b), and 11(c) are diagrams each showing a continuous memory area formed by the memory devices of FIG. 10.
Figure 11:
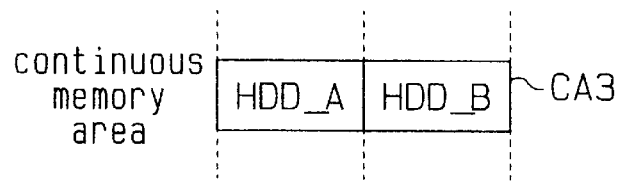
Figure 11:
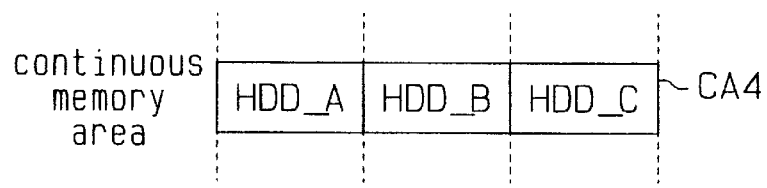

With reference to FIG. 10, in this state, a further memory device 101 is connected to the memory device 37. The memory device 101 includes an interface 101a, which complies with the IEEE 1394 standard, and a memory unit 101b, which has a memory area HDD_C.

As a result, a bus reset occurs in the memory device 37 or 101, the interfaces of the computer 32 and the memory devices 36, 37, 101 each enter a bus reset state, and the computer 32 recognizes the configuration change. Then, the reformation process of the continuous memory area is performed.

The computer 32 first reads the memory device management information stored in the configuration ROM of the memory device 36 and registers the memory device 36 as a memory device for forming a continuous memory area. With reference to FIG. 11(a), the computer 32 then forms a continuous memory area CA2 using the memory area HDD_A of the memory device 36.

Subsequently, the computer 32 reads the memory device management information stored in the configuration ROM of the memory device 37 and registers the memory device 37 as a memory device for forming a continuous memory area. With reference to FIG. 11(b), the computer 32 then forms a continuous memory area CA3 using the memory areas HDD_A and HDD_B of the memory devices 36, 37.

The computer 32 next reads the memory device management information stored in the configuration ROM of the memory device 101 and registers the memory device 101 as a memory device for forming a continuous memory area. With reference to FIG. 11(c), the computer 32 then forms a continuous memory area CA4 using the memory areas HDD_A, HDD_B, and HDD_C of the memory devices 36, 37, 101.

The usage of every memory device 36, 37, 101 is determined in this manner. Afterward, the computer 32 completes reformation of the continuous memory area.

[Reduction of Continuous Memory Area when Memory Device is Disconnected]

Figure 12:
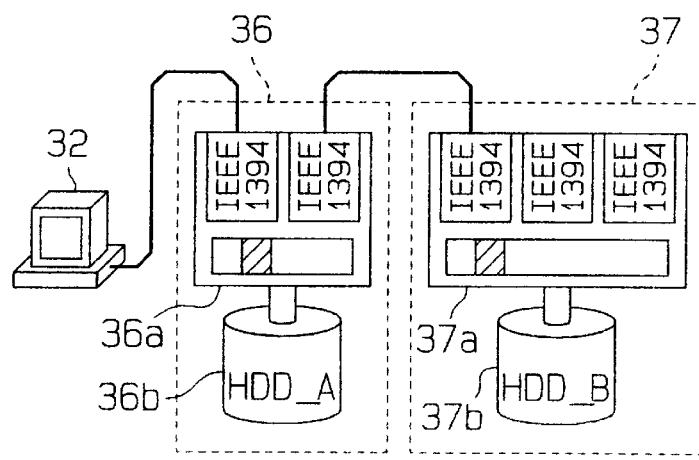
FIG. 12 is another schematic block diagram showing memory devices according to the present invention.

FIG. 10 shows the three memory devices 36, 37, 101, which are set to form a continuous memory area, connected to the computer 32. From this state, if the memory device 101 is disconnected from the memory device 37 as shown in FIG. 12, bus reset occurs at the memory device 37. Thus, the computer 32 and the two memory devices 36, 37 enter a bus reset state. Accordingly, the computer 32 recognizes the configuration change and reforms the continuous memory area.

The computer 32 first reads the memory device management information stored in the configuration ROM of the memory device 36 and registers the memory device 36 as a memory device for forming a continuous memory area. With reference to FIG. 13(a), the computer 32 then forms a continuous memory area CA5 using the memory area HDD_A of the memory device 36.

Then, the computer 32 reads the memory device management information stored in the configuration ROM of the memory device 37 and registers the memory device 37 as a memory device for forming a continuous memory area. With reference to FIG. 13(b), the computer 32 then forms a continuous memory area CA6 using the memory areas HDD_A, HDD_B of the memory devices 36, 37.

The usage of every one of the memory devices 36, 37 is determined in this manner. Afterward, the computer 32 completes the reformation of the continuous memory area.

[Reformation of Continuous Memory Area when Memory Devices Forming a Continuous Memory Area Are Mixed with Memory Devices Forming Independent Memory Areas]

FIG. 14 shows a memory device 102, which forms an independent memory area, connected to a system including the three memory devices 36, 37, 101, which are set to form a continuous memory area. The memory device 102 includes an interface 102a, which complies with the IEEE 1394 standard, and a memory unit 102b, which has a memory area HDD_D.

A bus reset occurs in the memory device 101 when the memory device 102 is connected to it. Thus, the computer 32 and the memory devices 36, 37, 101, 102 each enter a bus reset state. Accordingly, the computer 32 recognizes the configuration change and reforms the continuous memory area.

Figure 15A:
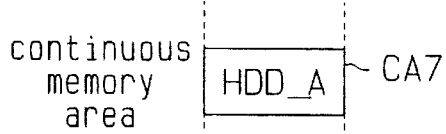
FIGS. 15(a), 15(b), 15(c), and 15(d) are diagrams each showing a continuous memory area formed by the memory devices of FIG. 14.

The computer 32 reads the memory device management information stored in the configuration ROM of the memory device 36 and registers the memory device 36 as a memory device for forming a continuous memory area. With reference to FIG. 15(a), the computer 32 then forms a continuous memory area CA7 using the memory area HDD_A of the memory device 36.

Figure 15B:
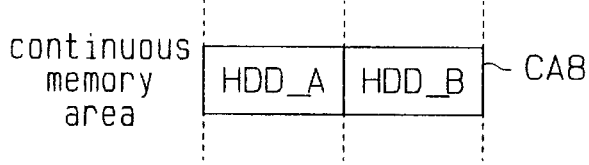

The computer 32 also reads the memory device management information stored in the configuration ROM of the memory device 37 and registers the memory device 37 as a memory device for forming a continuous memory area. With reference to FIG. 15(b), the computer 32 then forms a continuous memory area CA8 using the memory areas HDD_A, HDD_B of the memory devices 36, 37.

Figure 15C:
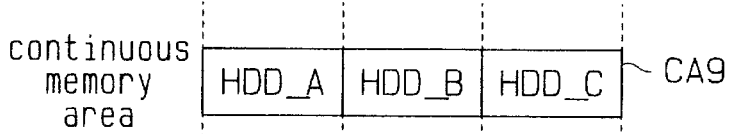

The computer 32 further reads the memory device management information stored in the configuration ROM of the memory device 101 and registers the memory device 101 as a memory device for forming a continuous memory area. With reference to FIG. 15(c), the computer 32 then forms a continuous memory area CA9 using the memory areas HDD_A, HDD_B, HDD_C of the memory devices 36, 37, 38.

Figure 15D:
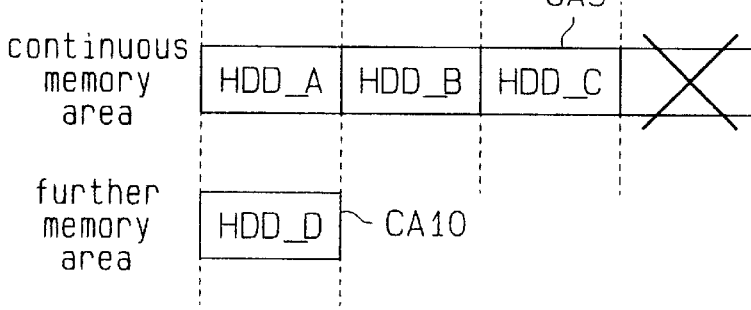

Next, the computer 32 reads the memory device management information stored in the configuration ROM of the memory device 102 and recognizes the memory device 102 as not being set to form a continuous memory area. Thus, the computer 32 registers the memory area HDD_D of the memory device 102 as an independent memory area. With reference to FIG. 15(d), the computer 32 then forms the continuous memory area CA9 using the memory areas HDD_A, HDD_B, HDD_C of the memory devices 36, 37, 38 and an independent memory area CA10 using the memory area HDD_D of the memory device 102.

The usage of every one of the memory device 36, 37, 101, 102 is determined in this manner. Afterward, the computer 32 completes the reformation of the continuous memory area.

[Reformation of Memory Area when a Memory Device is Used in a Plurality of Memory Devices]

Figure 16:
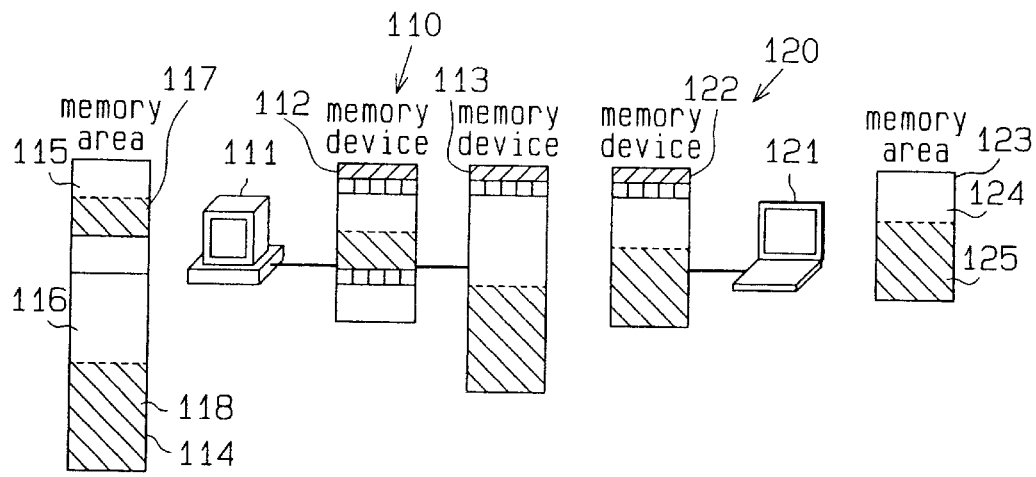
FIG. 16 is a schematic block diagram showing two computer systems according to the present invention.

With reference to FIG. 16, a first system 110 includes a first computer 111 and two memory devices 112, 113, which are connected to the first computer 111. The first computer 111 forms a single continuous memory area 114 from the memory areas of the memory devices 112, 113. Some of the continuous memory area 114 is used to store data 115 and 116. The first computer 111 registers the remaining area as open areas 117 and 118.

A second system 120 includes a second computer 121 and a memory device 122, which is connected to the second computer 121. The second computer 121 forms a single continuous memory area 123 from the memory area of the memory device 122. Some of the continuous memory area 123 is used to store data 124. The first computer 111 registers the remaining area as an open area 125.

Figure 17:
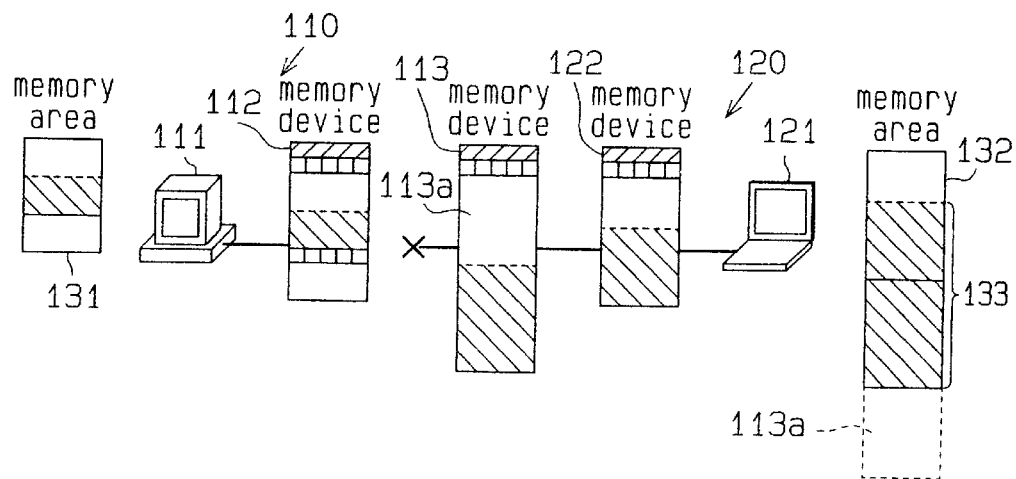
FIG. 17 is another schematic block diagram showing two computer systems according to the present invention.

Referring to FIG. 17, when data having a size larger than the open area 125 is required to be stored in the second system 120, the memory device 113 is disconnected from the first system 110 and connected to the memory device 122 of the second system 120. This is because the large amount of data can be stored in an area formed by combining the open area of the memory device 113 with the open area 125 of the memory device 113.

The first computer 111 thus recognizes the configuration change and forms a single continuous memory area 131 from the memory area of the memory device 112. The second computer 121 also recognizes the configuration change and forms a single continuous memory area 132 from the memory areas of the two memory devices 122, 113.

Accordingly, the second system 120 has an enlarged open area 133 and the large amount of data can be stored in the open area 133. The second computer 121 of the second system 120 determines whether or not data 113a stored in the memory device 113 can be used.

The data management system 31 (FIG. 3) of the present invention has the advantages described below.

(1) When a change in the configuration of memory devices occurs, based on the memory device management information of the memory devices 36, 37 connected to the computer 32, the computer 32 determines whether or not the memory devices 36, 37 may be used to form a continuous memory area and forms the continuous area from the memory areas of the usable memory devices. This increases the open area and enables storage of data having a large size.

(2) Based on the data management information included in the data of a memory device, the computer 32 determines whether or not the data is used when forming a continuous memory area. Thus, when the memory device is disconnected from one system and connected to another system, the other system can determine whether it can use the data.

(3) When the memory device is reconfigured, a bus reset takes place at the interfaces 36a, 37a of the memory devices 36, 37. This enables the continuous memory area to be reformed simply by connecting and disconnecting memory devices.

It should be apparent to those skilled in the art that the present invention may be embodied in many other specific forms without departing from the spirit or scope of the invention. Particularly, it should be understood that the present invention may be embodied in the following forms.

The memory device management information 44a may be stored in the memory unit 36b instead of the configuration ROM 44 of the interface 36a.

In addition to the memory devices 36, 37, 101 that satisfy the IEEE 1394 standard, other types of memory devices having hot plugging functions, such as those satisfying the USB standard, may be used.

A continuous memory area may be formed using memory devices including the memory device 35, which stores the OS 35a. In other words, a continuous memory area may be formed by computer-connected memory devices of different standards.

The present examples and embodiments are to be considered as illustrative and not restrictive, and the invention is not to be limited to the details given herein, but may be modified within the scope and equivalence of the appended claims.

What is claimed is:

1. A method for controlling a plurality of memory devices connected to a system, wherein each of the memory devices has a memory area, the method comprising the steps of:
   determining for each of the memory devices whether it is designated for forming a continuous memory area; and
   forming a single continuous memory area from the memory areas of the designated memory devices by storing divisional information into the designated memory devices, wherein the divisional information indicates a location of divisional data stored in each of the designated memory devices.

2. The method according to claim 1, further comprising:
   determining whether to use data that has previously been stored in the designated memory devices.

3. The method according to claim 1, further comprising the step of:
   generating management information on the divisional data stored in each of the designated memory devices.

4. The method according to claim 1, further comprising the step of registering an open area, in which no data is stored, in the memory area of each of the designated memory devices as an open area of the single continuous memory area.

5. The method according to claim 1, wherein the determining step and the forming step are performed whenever one of the memory devices is disconnected from the system or whenever an additional memory device is connected to the system.

6. The method according to claim 5, wherein each of the memory devices can be connected to and disconnected from the system during operation of the system.

7. The method according to claim 1, wherein each of the memory devices stores memory device management information, the determining step including the steps of:
   reading the memory device management information from the memory devices; and
   determining from the memory device management information whether the memory device is usable for forming the continuous memory area.

8. The method according to claim 1, wherein each of the memory devices stores data management information showing a usage status of data, the method further comprising the step of:
   determining whether to use the data based on the data management information stored in the designated memory devices.

9. The method according to claim 1, wherein the determining step includes determining whether each of the memory devices is usable to form a continuous memory area, the method further comprising the step of:
   registering an open area, which does not store data, in the memory area of each of the usable memory devices as an open area of the single continuous memory area.

10. A data management system comprising:
    a plurality of memory devices, each having a memory area; and
    a controller for determining whether each of the memory devices is usable for forming a continuous memory area and forming a single continuous memory area from the memory areas of the usable memory devices by storing divisional information into the usable memory devices, wherein the divisional information indicates a location of divisional data stored in each of the usable memory devices.

11. The system according to claim 10, wherein when a configuration of the memory devices changes, the controller controls each of the memory devices to determine whether each of the memory devices is usable for forming the continuous memory area and reforms the continuous memory area from the memory areas of the usable memory devices.

12. The system according to claim 10, wherein the controller registers an open area, in which no data is stored, in the memory area of each of the usable memory devices as an open area of the single continuous memory area.

13. The system according to claim 10, wherein the controller determines whether to use data that has previously been stored in the usable memory devices as data of the continuous memory area.

14. The system according to claim 10, wherein the plurality of memory devices include a first memory device connected to the controller and a second memory device connected to the first memory device, wherein, when the second memory device is disconnected from the first memory device, the first memory device provides the controller with configuration change information and the controller reforms the continuous memory area in accordance with the configuration change information.

15. The system according to claim 10, wherein the divisional information including management information on the divisional data stored in each of the designated memory devices.

16. A method for controlling a plurality of memory devices including a first memory device and a second memory device connected to the first memory device, wherein each of the memory devices has a memory area, the method comprising the steps of:

determining for each of the memory devices whether it is usable for forming a continuous memory area;

forming a single continuous memory area from the memory areas of the usable memory devices;

generating configuration change information when the second memory device is disconnected from the first memory device; and reforming the continuous memory area in accordance with the configuration change information by storing divisional information into the usable memory devices, wherein the divisional information indicates a location of divisional data stored in each of the usable memory devices.

17. A memory device having a memory area connectable to a system that forms a single continuous memory area using memory areas of a plurality of memory devices, the memory device comprising:

a memory unit for storing management information indicating whether the memory device is usable for forming part of the continuous memory area, wherein the memory unit stores divisional information indicating a location of divisional data stored in each of the usable memory devices.

18. The memory device according to claim 17, further comprising:

an interface for providing the system with configuration change information when another memory device is connected to or disconnected from the memory device.

* * * * *